Figures 1, 2:
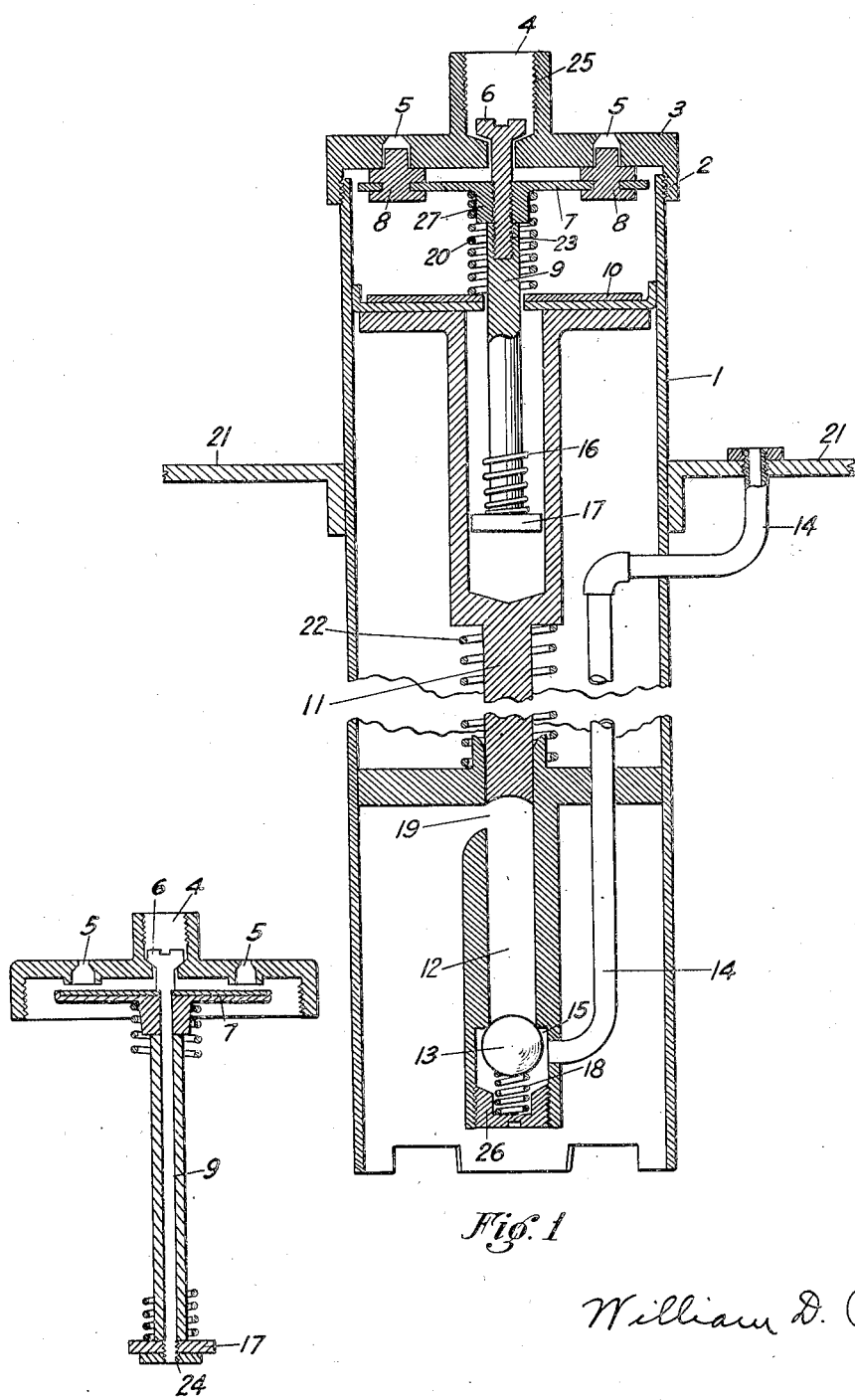

Nov. 19, 1929.  W. D. BELL  1,736,645
GREASE GUN
Filed Nov. 20, 1926

William D. Bell
INVENTOR.

BY Edwin P. Cortes
ATTORNEYS.

Patented Nov. 19, 1929

1,736,645

UNITED STATES PATENT OFFICE

WILLIAM D. BELL, OF COLUMBUS, OHIO, ASSIGNOR OF ONE-FOURTH TO EDWIN P. CORBETT, OF COLUMBUS, OHIO

GREASE GUN

Application filed November 20, 1926. Serial No. 149,772.

My invention relates to grease guns and has to do with that class of devices utilized to direct lubricant to the various parts of an automobile or other machine which requires lubrication and has particular reference to those devices which force the lubricant into the proper conduits or crevices under pressure.

I have provided a novel form of grease gun that is particularly adapted for use wherever compressed air is available. Another feature of this invention resides in the fact that the normal operation of the device serves to conduct the lubricant from its original container direct to the conduits or crevices to be lubricated.

My invention preferably takes the form of a discharge chamber and a plunger reciprocating therein, this plunger being automatically reciprocated as long as air under pressure is introduced into my device. It also comprises means for keeping the discharge chamber in constant communication with the original grease container, except during the time in which actual discharge takes place.

The combination has the advantage of enabling the attendant to omit filling the grease gun from time to time, it being only necessary for him to introduce the inlet end of the apparatus into the drum to the proper extent and to attach the air connection to the source of compressed air. Then, the pumping action will begin and will serve to draw successive charge of the lubricant from the container and to eject it from the gun. With this gun properly connected to the various conduits or crevices of an automobile, or other apparatus, the successive charges of lubricant will be delivered to their proper parts.

The preferred embodiment of my invention is shown in the accompanying drawings wherein similar characters of reference designate corresponding parts and wherein Figure 1 is a longitudinal section of a grease gun which embodies features of my invention.

Figure 2 is a cross-section showing a modification of the valve construction as set forth in Figure 1.

In Figure 1, I have shown a longitudinal cross-section of a grease gun having an outside casing 1 attached to which is the collar 21 for ensuring the stability of the gun when inserted into a grease container. The casing 1 is externally threaded as at 2 for the reception of the internal threads of the cylinder head 3. This cylinder head 3 has an air inlet 4 and exhaust ports 5.

The inlet port 4 contains the air inlet valve 6 to which is attached, by means of the threads 23, the valve stem 9 and the yoke 7 to the forked arms to which are attached the exhaust valves 8.

The unbalanced air pressure upon the inlet and exhaust valves holds these valves to their seats when shifted. Thus, in the position shown in Figure 1, wherein the inlet valve 6 is open and the exhaust valves 8 are closed, the entire valve assembly is held in position and the valves 8 held in their seats by the pressure of the air within the cylinder, which is above atmospheric, acting upon the effective area of the valves 8.

When air under pressure is admitted through the inlet 4, which is threaded as at 25 to provide means for connection to a compressed air line, it passes around the open valve 6 and exerts pressure upon the piston 10 forcing it downwardly. Thus, the plunger 11, an integral part of the piston 10, is caused to move downwardly through the grease cylinder 12. This action forces the lubricant past the ball valve 13, which may be adjusted, repaired or renewed by means of the screw 26 threaded into the lower end of the grease cylinder 12, and thence into the delivery tube 14. The plunger 11 overruns the counterbore 15, carrying the ball valve 13 with it, reducing the clearance of the pump to zero.

The piston 10, in its downward movement, comes in contact with the spiral spring 16 located on the lower end of the valve stem 9 and resting against a collar 17.

The force exerted on the valve stem 9, by the downward pressure of the piston 10 through the medium of the spiral spring 16, closes the inlet 4 by moving the valve 6 downwardly and opens the exhaust ports 5 by moving the valves 8 downwardly, thus, allowing the air under pressure to escape through the exhaust ports 5. The valve assembly is now held in position by the line pressure acting upon the effective area of the inlet valve 6.

The decreased pressure on the upper face of the piston 10, caused by the exhaust ports 5 being opened and the inlet 4 being closed, and the pressure in the opposite direction, caused by the compression of the spiral spring 22 by the downward motion of the piston 10, stops the downward motion of the piston 10. Then, the actuating force of the compressed spring 22 acting against the lower face of the piston 10, starts it on its upward travel, this upward motion drawing the plunger 11 through the grease cylinder 12.

As the ball valve 13 is released by the upward motion of the plunger 11, it immediately closes the lower opening of the tube 12, the ball valve 13 being forced upwardly and held against the opening by the spring 18.

The upward movement of the plunger 11 and the closing of the lower end of the grease cylinder 12 by the ball valve 13 creates a vacuum in the grease cylinder 12, into which the grease from the container flows, by way of the opening 19, immediately upon the passing of that point by the plunger 11. Thus, the gun is automatically recharged.

As the piston 10 travels toward the cylinder head 3, it comes in contact with the spiral spring 20 which is compressed by the continued upward movement of the piston 10 until the tension upon the spring 20 becomes great enough to overcome the unbalanced air pressure on the valve 6 and lifts it from its seat.

The spring 20 should be so proportioned as to length and tension that the valves are shifted and the piston 10 is brought to rest before striking the head 3 or any other part of the valve mechanism.

Accordingly, when the valve 6 is opened, the pressure within the cylinder builds up, checks the movement of the piston 10 in its travel toward the head, and finally drives it on the delivery stroke as hereinbefore described.

Figure 2 is a modification of the valve stem construction as set forth in Figure 1, in that the exhaust valves 8, as shown in Figure 1, are eliminated and the disk 7, as shown in Figure 2, is substituted in their place. The construction of the valve stem 9 is also changed in that it is a hollow cylinder having the inlet valve stem passing completely through it and attached by means of the collar 17, as shown in Figure 2, in place of being attached as at 23, as shown in Figure 1. When the inlet valve stem is attached to the collar 17, as shown in Figure 2, the chance of its becoming loosened by the action of the valve mechanism is eliminated.

It will thus be seen that I have constructed a grease gun having many advantages which, preferably, embody the use of poppet valves in place of disk valves to ensure a minimum of lost pressure due to leakage around the valves when closed; a flange 27 for centering the spring 20, thus keeping the valve mechanism in alignment; a plunger having a concave end conforming to the shape of the ball valve, thus reducing the clearance of the pump, and an unrestricted passage for the grease to the inlet port which leads directly to the grease cylinder ensuring the recharge of the pump.

Having thus described my invention, what I claim is:

1. A grease gun for delivering grease to a point to be lubricated comprising a cylinder, a main body portion adapted to be inserted into and removed from a drum of grease, an inlet for said cylinder, outlet valve for said cylinder having a rounded surface, and a plunger operating in said cylinder, said plunger having its end concave to conform to the rounded surface of said valve.

2. A grease gun comprising a cylinder into which grease is adapted to be drawn by suction, a plunger operating in said cylinder for creating the suction and then expelling the grease therefrom, fluid motor means for reciprocating said plunger, a skirt surrounding the lower end of said cylinder and spaced therefrom for forming a chamber open at its bottom, the said cylinder having an inlet opening adjacent the upper edge of said skirt.

3. A grease gun comprising a cylinder having an inlet opening in the side wall thereof into which grease is adapted to be drawn by suction, a plunger operating in said cylinder for creating a suction to draw grease through said opening and then moving forward to close said opening and expel the grease from said cylinder, a skirt surrounding the lower end of said cylinder for forming a chamber open at its bottom, the inlet opening to said cylinder being adjacent the upper end of said skirt.

4. A grease gun comprising a cylinder adapted to be inserted into a drum of grease to withdraw the grease therefrom and deliver it toward a point to be lubricated, a fluid motor having exhaust ports, a plunger connected to said motor and operating in said cylinder, and an inlet valve and a plurality of exhaust valves connected to said plunger and operable by movement of said plunger, said exhaust valves being of such construction as to interfit the walls of said exhaust ports.

In testimony whereof I hereby affix my signature.

WILLIAM D. BELL.